UNITED STATES PATENT OFFICE.

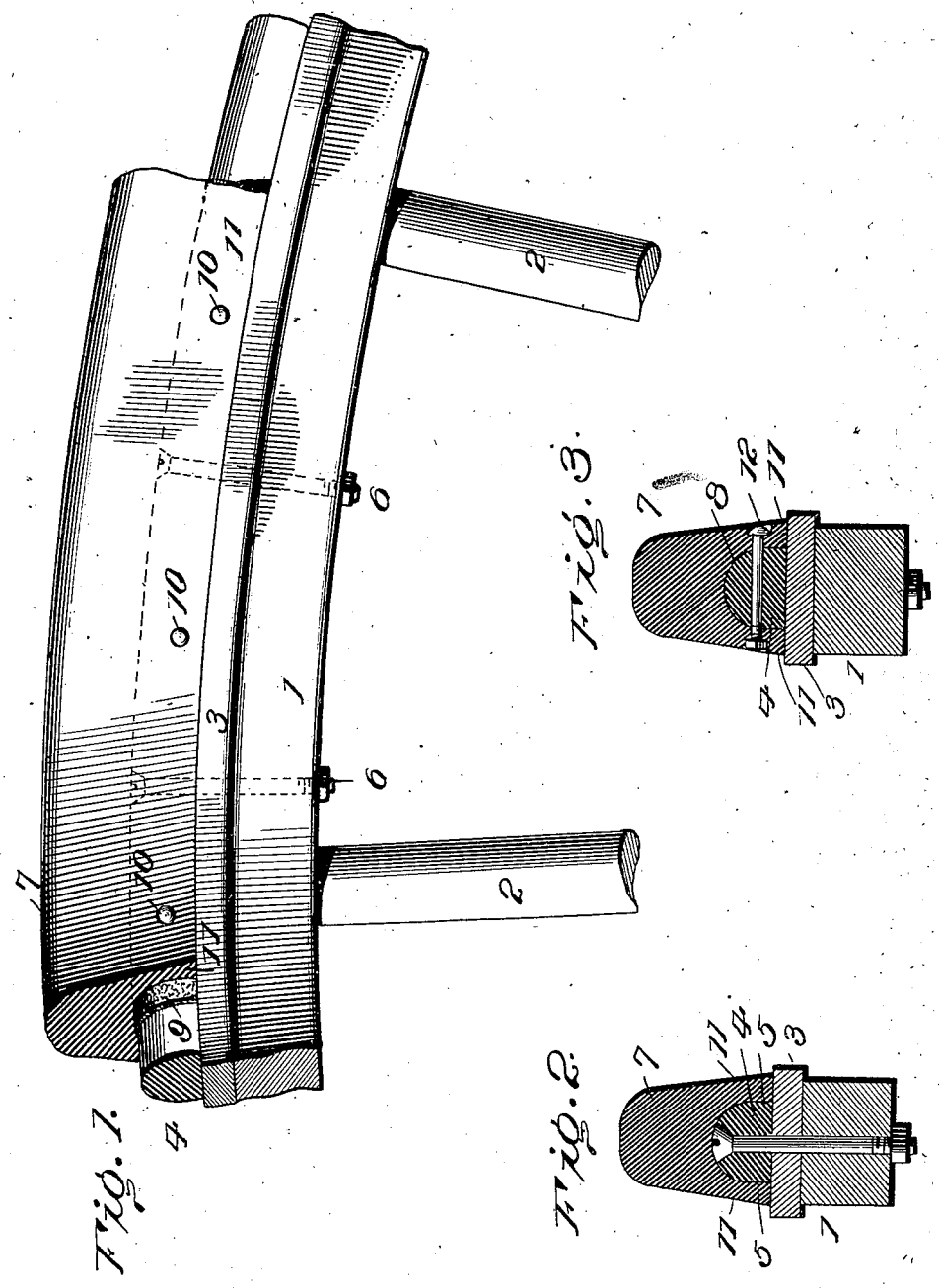

WILLIAM KIGHTLINGER, OF MARYSVILLE, OHIO.

ELASTIC TIRE.

SPECIFICATION forming part of Letters Patent No. 680,332, dated August 13, 1901.

Application filed October 25, 1899. Serial No. 734,730. (No model.)

*To all whom it may concern:*

Be it known that I, WILLIAM KIGHTLINGER, a resident of Marysville, in the county of Union and State of Ohio, have invented certain new and useful Improvements in Elastic Tires; and I do hereby declare the following to be a full, clear, and exact description of the invention, such as will enable others skilled in the art to which it pertains to make and use the same.

This invention relates to elastic tires for wheels, and has for its object to provide a compound elastic tire having superior efficiency and durability and capable of easy application to an ordinary wheel and to others and adapted also to be easily renewed.

The invention consists in the construction hereinafter described and pointed out.

In the accompanying drawings, Figure 1 is a broken perspective of a wheel-rim with the improved tire applied. Fig. 2 is a transverse section of the same. Fig. 3 is a section of a modified detail.

Numeral 1 indicates a felly, and 2 indicates spokes. 3 denotes an ordinary metal tire. These may be of any usual or preferred construction. The wheel-rim may consist of a single piece of bent wood and the metal tire may be heavy or light, as desired. In some cases, where but little strength is required in the wheel, the metal tire may be omitted, though ordinarily it will be required to insure suitable strength in the wheel, and the invention is primarily for metal-tired wheels.

To the wheel-rim is secured a solid piece of rubber 4, preferably in the form of a complete ring and of suitable dimensions to be sprung onto the wheel and to embrace it with a moderate degree of tension. This rubber ring is approximately semicircular in cross-section, but has parallel sides 5, as represented.

6 denotes bolts or the like, whereby the rubber ring or band 4 is fastened at suitable intervals to the wheel-rim. The bolts may be screw-threaded and provided with nuts for detachably securing the band 4 to the wheel. This band will not be subject to wear, and it will not ordinarily be necessary to remove it unless for repairing the wheel or resetting the metal tire.

The band 4 has less width than the metal tire and has its outer part rounded and its inner part plain to sit flat on the metal tire, substantially as shown. It may be further secured to said tire by cement.

7 denotes a second rubber band constituting an outer section of the compound elastic supplemental tire. It has a form resembling somewhat the inner section or band 4.

8 denotes a continuous concavity formed in it to adapt it to fit the band 4. Cement 9 is used to make a tight joint between these sections.

10 indicates rivets passed through the inner band 4 and through the wings 11 of the outer section to bind them together. Screw-bolts 12 may be used instead of rivets, if desired; but in such case the bolt-heads and the securing-screws will be sunk in the rubber, as indicated in Fig. 3.

The main part of the compression of the elastic tire will occur in the outer section, the inner section being removed from immediate pressure and defended by the outer section. The rivets pass through the wings which embrace the inner section. The inner section, however, will yield under transmitted pressure to some extent, whereby injurious strain on the material about the rivets is avoided. When the outer rubber section becomes worn, cut, or broken, a new one can be substituted by a person of ordinary skill, and no special skill or tools are required either for the original application of the rubber tire or for subsequent repairs, and, as before noted, in effect, no modification of an ordinary wheel-rim and tire is required.

Rubber tires or bands have been combined with metallic tires, and bolts have been used to detachably connect tires upon rims, and such devices are not broadly of my invention.

I am aware that compound tires comprising elastic bands and canvas or metal interposed between the bands, the whole being secured to the wheel, have been proposed, and such construction is not herein claimed. By my improvement both bands of the compound elastic part of the tire rest directly on the outer face of an ordinary flat tire and are detachably connected thereto, the inner part directly and the outer part mediately. The construction is such that the two parts can be secured to an ordinary flat tire within its edges and without the intervention of fastening devices other than the securing-bolts or the like, and such that the outer band can be readily detached and a fresh unworn band substituted. Further, the metal tire defends the elastic band from wear, such as produced by running obliquely against a curbstone or other like obstruction.

Having thus described my invention, what I claim is—

In a wheel, the combination of a wooden rim, a metal tire, a compound elastic supplemental tire comprising a ring detachably secured by bolts to the metal tire and rim, a rubber band covering the ring in close contact therewith and bearing on the face of the metal tire on both sides of the ring, said band being narrower than the metal tire whereby it is defended from wear at its sides, and bolts passing transversely through the ring and band parallel to the metal tire for detachably securing the band and ring together.

In testimony whereof I have signed this specification in the presence of two subscribing witnesses.

WILLIAM X KIGHTLINGER.
(his mark)

Witnesses:
LUCILLE CURRY,
CHAS. D. MOREY.